UNITED STATES PATENT OFFICE.

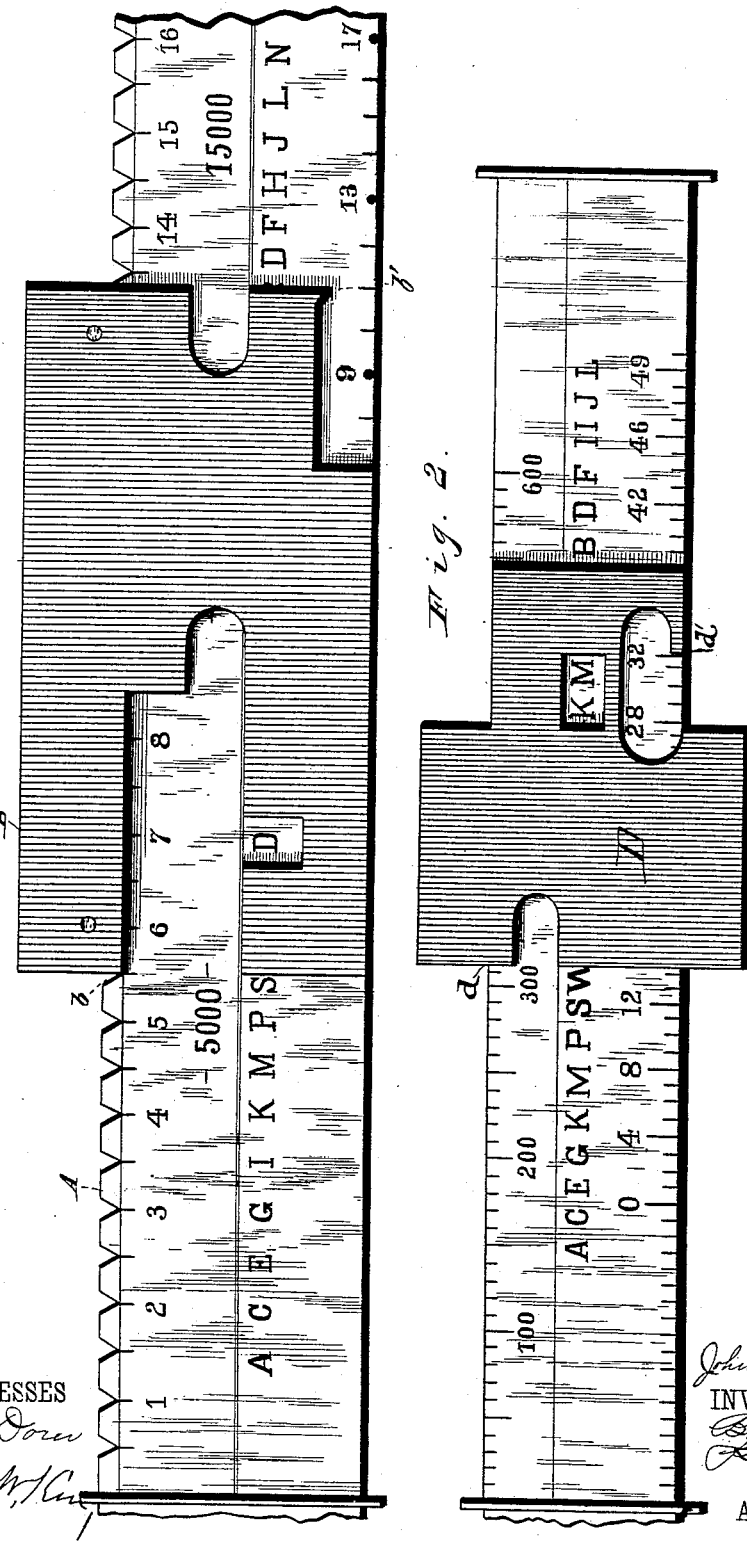

JOHN A. DEMUTH, OF TOLEDO, OHIO.

DUPLEX-CHECK SCALE-BEAM.

SPECIFICATION forming part of Letters Patent No. 293,637, dated February 19, 1884.

Application filed November 14, 1883. (No model.)

*To all whom it may concern:*

Be it known that I, JOHN A. DEMUTH, of Toledo, in the county of Lucas and State of Ohio, have invented certain new and useful Improvements in Duplex-Check Scale-Beams; and I do hereby declare the following to be a full, clear, and exact description of the invention, such as will enable others skilled in the art to which it pertains to make and use the same.

My invention relates to improvements in duplex-check scale-beams; and it consists in certain features of construction and in combination of parts hereinafter described, and pointed out in the claims.

In weighing cars, grain, coal, and other articles, especially when the transactions are large and the operation of weighing is sometimes necessarily hurried, many mistakes occur, usually in entering the weight in the scale-book. In the ordinary way of making these entries, if it is afterward found that a mistake has been made, there is no clue left by which the true weight can be even approximately ascertained.

The object of my invention is to provide scale-beams on which are marked a series of letters and figures, beside those ordinarily used, and that are to be entered in the scale-book, together with the usual entries of the weight in figures, and that will, in case that a mistake has been made, indicate what the weight was, and what the entry should have been, and by means of which, at any time, the entries in the scale-book may be tested by the scale-beam and poise, so as to disclose whether the operator is accurate or careless in the discharge of his duty.

In the drawings, Figure 1 is a side elevation of a portion of the large scale-beam and the weight or poise. Fig. 2 is a side elevation of the small scale-beam and weight or poise.

A represents the large scale-beam, on which the weight in thousands is indicated and is notched on top and numbered in the usual manner. Below and longitudinally on the scale-beam are letters purposely arranged other than alphabetically, and care being had that the same letter is not repeated, except they are some distance apart. The lower side of the beam has also a scale commencing a distance to the right hand from where the upper scale commences that is equal to the length of the weight B. The marks on the lower scale should be the same distance apart as are the notches on the upper scale. It will be seen that on the upper scale the value of the numerals increases, one with every two notches, while on the lower scale the numbers increase, one with every mark on the scale. The left-hand end of the poise B, at $b$, indicates the weight on the upper scale, and the point $b'$ indicates the number of the lower scale that is to be noted. The letters aforesaid occupy even longitudinal spaces with the notches above, and when the end $b$ is at a notch, as shown, a slot in the weight B will expose a letter, which, in the position shown, is the letter D. It will be observed that the point $b$ is at a notch midway between 5 and 6, indicating $5\frac{1}{2}$, while the point $b'$ is at 11—twice the amount of the former.

In operating the device, the weigher is required to make his entry as follows: First enter the number indicated by the point $b'$ on the lower scale, next the letter exposed in the said slot, and last the number indicated on the scale above. The entry in the present case would be 11—D—5500. The letter in the entry is supposed to be correct, as but one letter is exposed when the entry is made. Mistakes more frequently occur by transposing figures; but this is not so likely to occur with the smaller numbers on the lower scale, and if the number from this scale and the letter is entered correctly it will at once be seen what the entry for the upper scale should have been. But suppose (as may occur in rare instances) a mistake has been made in entering the number from both scales. As the numbers are small on the lower scale, the entry would probably be approximately near the right number; and as the letters are only repeated at long distances on the scale-beam, a letter of the kind made in the entry, and that when shown in the said slot of the weight B will bring the point $b'$ nearest to the number entered from the lower scale, will undoubtedly indicate the correct number, and from which the mistake in the entry may be corrected. The letters are so arranged that in case the numbers on the lower scale are transposed in the entry—as, for instance, 12 were entered 21—upon moving the point $b'$ to 21 on the lower scale the letter will not be found in the vicinity of the notch that was shown in the notch when the point $b'$ was at the number 12, as when the entry was made. The short scale-beam C below, (shown in Fig. 2,) on which the odd hundreds and fractions thereof are indicated, is arranged in a similar manner, except the numbers on the lower scale at the point $d'$ are the same as shown at $d$ at the left hand of the poise D, omitting the right-hand figure. In the position shown at the point $d$ the scale should read 320, and at the point $d'$ 32. Unlike the poise B, that is always left with the point $b$ in a notch, the poise D is adjusted at any point where it will balance the load. If, therefore, the opening through which the letters are seen were only large enough to exhibit one letter, sometimes only a portion of a letter or of two letters would be shown. The opening is therefore made long enough so that when in certain positions—as, for instance, the one shown—two letters are exhibited, and in any position at least one whole letter will be seen. In making the entry the parts of letters shown are not noted. The entry for the lower scale-beam with the poise D in the position shown should be 32—K—M—320, and the entire entry should be—

```
    11—D—5500        Total
    32—K—M—320       5820
```

It is customary in some places to only enter the thousands from the upper scale-beam, and to add the five hundred, when it occurs to the number taken from the lower beam, which would make the entry thus:

```
    11—D—5000        Total
    32—K—M—820       5820
```

If the letters were arranged alphabetically, and the lower figures and scale on the two scale-beams were arranged in the same manner as compared with the upper figures, respectively, the operator might soon learn the system so that he could, after entering the weight, make the other entries from memory and without looking at the letters or lower scale, and entries made in such a manner would be no improvement over the old system. I therefore arrange the letters otherwise than alphabetically, and arrange them different on the two scale-beams, and also make a slight difference between the lower scales, as before described.

At any time after the weighing and entering in the scale-book in accordance with my invention, by placing the poise on one or both of the scale-beams, so as to indicate the number on the upper scale or scales that corresponds with the weight entered in the scale-book, the letters shown and the figures in the lower scales indicated will show if the operator has been accurate or careless in the discharge of his duty.

It is not essential that the letters and lower scales should be arranged just as shown. Any arrangement of the same in a manner that will accomplish the same purpose will be clearly within the spirit of my invention.

When ordinary scale-beams are already in use and it is not desirable to change them, I sometimes add other beams, on which are marked the series of letters, and the lower or secondary scale of figures before described, and with a slide provided with a pointer for the said secondary scale and a slot or opening in the slide to show the letters. Now, if this slide is moved with the poise on the primary scale-beam, the result will be the same as already described, when the letters and secondary scale were marked on the primary scale-beam.

What I claim is—

1. A series of letters or characters on a scale-beam, in combination with a poise so arranged that always at the same distance from the part of the poise that indicates the weight on the scale-beam one or more of the aforesaid letters or characters will be exposed to view, while the adjacent letters or characters on one or both sides will be concealed by the poise, substantially as set forth.

2. In a scale-beam provided with a scale and poise arranged in the usual manner, the combination, with a series of letters or characters and an open space in the poise, as aforesaid, of a second scale and a pointer or other means on the poise for indicating numbers on the second scale, and so arranged that the numbers indicated on the second scale should be different from the numbers indicated at the same time on the first scale, but should always be of the same relative value to the said numbers indicated on the first scale, substantially as set forth.

3. The combination of two scale-beams, each arranged with a scale and poise in the usual manner, and each provided with a series of letters and an opening in the poise for reading the same, and with a second scale and pointer, substantially as set forth.

4. One or more secondary scales whose figures bear a given ratio to the figures on the primary scale, where the weights are indicated, and a series of letters or characters, the said scale being provided with suitable mechanism whereby figures are indicated on the secondary scale and letters or characters of the said series are exposed to view, and always at the same distance from the point where the weights are indicated on the primary scale, substantially as set forth.

In testimony whereof I sign this specification, in the presence of two witnesses, this 6th day of November, 1883.

JOHN A. DEMUTH.

Witnesses:
  LOU R. KNISELY,
  ISAAC E. KNISELY.